United States Patent
Deixler et al.

(10) Patent No.: US 12,549,976 B2
(45) Date of Patent: Feb. 10, 2026

(54) CONTROL DEVICE, NETWORK, METHOD AND COMPUTER PROGRAM FOR CONTROLLING A PRESENCE DETECTION USING RADIO FREQUENCY SENSING IN A NETWORK

(71) Applicant: SIGNIFY HOLDING B.V., Eindhoven (NL)

(72) Inventors: Peter Deixler, Arlington, MA (US); Leendert Teunis Rozendaal, Valkenswaard (NL); Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 372 days.

(21) Appl. No.: 18/017,126

(22) PCT Filed: Jul. 13, 2021

(86) PCT No.: PCT/EP2021/069403
§ 371 (c)(1),
(2) Date: Jan. 20, 2023

(87) PCT Pub. No.: WO2022/017861
PCT Pub. Date: Jan. 27, 2022

(65) Prior Publication Data
US 2023/0224739 A1 Jul. 13, 2023

Related U.S. Application Data

(60) Provisional application No. 63/054,430, filed on Jul. 21, 2020.

(30) Foreign Application Priority Data

Aug. 4, 2020 (EP) .................................. 20189276

(51) Int. Cl.
*H04W 24/08* (2009.01)
*H04W 48/16* (2009.01)
(52) U.S. Cl.
CPC ........... *H04W 24/08* (2013.01); *H04W 48/16* (2013.01)

(58) Field of Classification Search
CPC .............................. H04W 48/16; H04W 24/08
(Continued)

(56) References Cited

U.S. PATENT DOCUMENTS 10,217,346 B1    2/2019   Zhang et al.
2005/0141997 A1* 6/2005   Rast .................. F41A 19/03
                                              416/229 R
(Continued)

FOREIGN PATENT DOCUMENTS

EP    1534037 A1    5/2005
GB    2536722 A     9/2016
(Continued)

OTHER PUBLICATIONS

Mrazovac, Bojan et al., "A Human Detection Method for Residential Smart Energy Systems Based on Zigbee RSSI Changes," Article in IEEE Transactions on Consumer Electronics, Aug. 2012 (3 Pages).

(Continued)

*Primary Examiner* — Faruk Hamza
*Assistant Examiner* — Jean F Voltaire

(57) ABSTRACT

The invention relates to a control device for controlling radio frequency sensing in a network (100), e.g. Zigbee or Wi-Fi network, comprising a detection area (120). The control device (110) comprises a neighboring network information providing unit (111), wherein the neighboring network (150) comprises a neighbor network device (154) neighboring a network device of the network (100), and a network controlling unit (112) for controlling a network device (103) based on the provided neighboring network information such that the network device of the network is enabled to detect a signal usable for radio frequency sensing in a detection area (170) extending outside of the detection area of the network (100) and/or for radio frequency sensing in the detection area of the network (100), wherein the detected signal is transmitted by at least one neighbor network device. This allows to improve the radio frequency detection in peripheral areas of a network.

13 Claims, 4 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2015/0160673 A1 | 6/2015 | Vasylyev | |
| 2016/0198548 A1* | 7/2016 | Monaci ................. | H05B 47/11 |
| | | | 315/297 |
| 2019/0272741 A1 | 9/2019 | Mackenzie et al. | |
| 2022/0335817 A1* | 10/2022 | Schober ................. | H04L 67/12 |
| 2023/0019044 A1* | 1/2023 | Bora ....................... | H04W 4/80 |
| 2023/0291798 A1* | 9/2023 | Wang ....................... | H04L 9/50 |

FOREIGN PATENT DOCUMENTS

| | | | |
|---|---|---|---|
| WO | 2014066091 A2 | 5/2014 | |
| WO | 2015117017 A1 | 8/2015 | |

OTHER PUBLICATIONS

Vasisht, Deepak, et al., "Duet: Estimating User Position and Identity in Smart Homes Using Intermittent and Incomplete RF-Data," Proc. ACM Interact. Mob. Wearable Ubiquitous Technol., vol. 2, No. 2, Article 84, Massachusetts Institute of Technology, 2018 (21 Pages).

* cited by examiner

CONTROL DEVICE, NETWORK, METHOD AND COMPUTER PROGRAM FOR CONTROLLING A PRESENCE DETECTION USING RADIO FREQUENCY SENSING IN A NETWORK

CROSS-REFERENCE TO PRIOR APPLICATIONS

This application is the U.S. National Phase application under 35 U.S.C. § 371 of International Application No. PCT/EP2021/069403, filed on Jul. 13, 201, which claims the benefit of U.S. Provisional Patent Application No. 63/054,430, filed on Jul. 21, 2020 and European Patent Application No. 20189276.7, filed on Aug. 4, 2020. These applications are hereby incorporated by reference herein.

FIELD OF THE INVENTION

The invention relates to a control device, a network, a method and a computer program for controlling a presence detection using radio frequency sensing in a network comprising a plurality of network devices.

BACKGROUND OF THE INVENTION

Radio frequency sensing is a technology that allows for motion, presence, occupancy, fall and/or breathing detection, and even people counting and people behavior analysis to be measured quite reliably based on how human beings affecting and/or disturbing wireless signals transmitted among a group of network devices, i.e. transmitted within a network. This technology can be quite convenient since no extra hardware except the hardware already installed for the network is needed, which eliminates the need for a physical on-site installation of presence detection. Moreover, the radio frequency sensing has potentially a better coverage compared with sensing technologies such as cameras or passive infrared sensors, which have a quite limited field of view and require a line of sight connection. Moreover, this technology can advantageously be added to network devices like lights and luminaires and can also be used in professional and residential applications.

While radio frequency sensing performed, for instance, by network devices with lighting capability, usually covers the area between the involved network devices, the detection of occupancy in areas at the periphery of a network, for instance, in parts of a house away from the network devices, might not be reliable. This might result in a sparse or inexistent coverage of occupancy detection, for instance, at borders of a room or house, if, for example, network devices used as ceiling lights located in the middle of each room should be used for the occupancy detection. The same problems can occur if network devices like lights provided in a garden along a walking path are used for occupancy detection, wherein the occupancy detection in this case might not be very reliable for perimeters of the property far away from the path illuminated by the network devices. This can be especially problematic if the occupancy detection is used for security purposes, like providing light when motion is detected, since especially the periphery of a house or garden, for instance, the dark parts of a garden far away from an illuminated path, are used by unauthorized persons for entering the property. Hence, it would be advantageous if a mechanism could be provided that allows to perform the radio frequency sensing reliably also in the outer perimeters of an area covered by the network performing the radio frequency sensing.

EP1534037A1 discloses a method for determining device proximity in a wireless network, which includes characterizing at a first device any detected wireless network radio signals; receiving any broadcast network characteristics from at least one other device on the network; comparing the first device network characteristics with the received network characteristics from the at least one other device on the network; if the network characteristics are within a predetermined relationship, the first device and the at least one other device are in proximity with one another.

SUMMARY OF THE INVENTION

It is an object of the present invention to provide a control device, a network, a method and a computer program that allow to improve the radio frequency detection in peripheral areas of a network.

In a first aspect of the invention a radio frequency sensing control device for controlling radio frequency sensing in a network comprising at least one network device is presented, wherein at least one of the network devices is adapted to perform radio frequency sensing in a detection area of the network based on the communication signals transmitted within the network, wherein the radio frequency sensing control device comprises a) a neighboring network information providing unit for providing information on a neighboring network, wherein the neighboring network comprises at least one neighbor network device neighboring at least one network device of the network, and b) a network controlling unit for controlling the at least one network device based on the provided neighboring network information such that the at least one network device of the network is enabled to detect a signal usable for radio frequency sensing in a detection area extending outside of the detection area of the network and/or for radio frequency sensing in the detection area of the network, wherein the detected signal is transmitted by the at least one neighbor network device.

Since the network controlling unit is adapted to control a network device based on information provided on a neighboring network such that the network device of the network can use signals transmitted by a neighboring network device of the neighboring network for radio frequency sensing, the radio frequency sensing can be extended outside the detection area of the network and the detection results allow an improved occupancy detection in this extended area. Moreover, using radio frequency sensing signals of the neighbor network devices can also improve the sensing quality of the radio frequency sensing within the detection area of the network, in particular, if the detection areas of the network and the neighboring network overlap in some parts. Thus, the radio frequency sensing control device allows to provide an improved occupancy detection in the periphery of a detection area of the network and/or in the detection area of the network controlled by the radio frequency sensing control device itself.

The network can be any kind of wireless network and can be based on different kinds of radio frequency technologies and communication protocols like Wi-Fi, Thread, Bluetooth, Cellular device2device communication, V2X protocol. ESP-now or Zigbee. The network is then preferably formed by a plurality of network devices according to the technology and protocol used for the network. However, the network can also be defined by only one network device that is network enabled, i.e. enabled to form a network when brought in communicative contact with another network device. In this special case the network can be regarded as being the only one network device and the detection area of the network can comprise an extent of zero or the network device can use reflections of its own signals for radio frequency sensing such that also in this case a certain extent of the detection area can be provided based on the presence or absence of reflectors in the environment of the network device. Preferably, the network comprises at least three network devices. However, in an embodiment the network controlled by the radio frequency sensing control device can comprise only two network devices, wherein in this case the at least one network device that is adapted to perform the radio frequency sensing might not be able to perform a reliable radio frequency sensing between the two network devices. Thus, although the network device is adapted to perform radio frequency sensing in a detection area of the network based on the communication signals transmitted within the network, it is not necessary that a network itself already comprises enough network devices to perform a reliable radio frequency sensing in the detection area of the network.

At least one of the network devices that can be controlled by the radio frequency sensing control device is adapted to perform radio frequency sensing in the detection area of the network based on the communication signals transmitted within the network. The detection area of the network is generally defined by the distribution of the network devices of the network and the capability of the sensing network devices, i.e. the network devices performing radio frequency sensing, to receive communication signals from the other network devices. Moreover, the detection area can also be defined by the area in which a reliable radio frequency sensing is possible, for instance, an area in which a reliability parameter, like the number of false positives, the number of false negatives, a ratio between the false positives and the general detection number, etc., falls within a user acceptable value range. In a case in which no reliable radio frequency sensing is possible, like in the extreme case in which only one network device is present in the network and no suitable reflectors in the environment allow the network device to use its own signals for radio frequency detection, the detection area extent is zero. The communication signals transmitted within the network and used for radio frequency sensing by the sensing network device can refer to all kinds of communication signals that are generally used with respect to the communication protocol used by the network, for instance, control messages, network maintenance messages, information providing messages, etc., wherein the sensing network device can be adapted to use a received signal strength indicator, a channel state information or any other measure indicative of a disturbance of the signal between a sending network device and the sensing network device.

The network can be formed by any type of network device. Preferably, a network device, in particular, a network device with radio frequency sensing capability, refers to a device that is useable as part of a smart home or office application. For instance, a network device with radio frequency sensing capability can be a sensor device, like a temperature sensor, an application providing device providing an application to a user, like a smart TV, loudspeaker, heating unit, etc., and/or a controlling device, for instance, for controlling other network devices of the network. In a preferred embodiment the network device comprising radio frequency sensing capabilities is a smart lighting device that is part of a network comprising further smart lighting devices.

The neighboring network information providing unit is adapted to provide information on a neighboring network. A neighboring network refers to a network of network devices that is within communication range of the network controlled by the radio frequency sensing control device. In particular, a neighboring network of the network controlled by the radio frequency sensing control device comprises at least one neighbor network device neighboring at least one network device of the network. A neighbor network device can be regarded as neighboring a network device of the network controlled by the radio frequency sensing control device if the at least one network device can receive communication signals from the neighbor network device that allow to establish a communication between the network device and the neighbor network device. In one example, a neighboring network can be built from network devices that are located in a same area, for instance, detection area or location, as the network devices of the network, but which are not part of the network. In other examples, the neighboring network is built from network devices in a different area, for instance, detection area or location, as the network devices of the network, or a combination of network devices in an area of the network and outside an area of the network. The neighboring network preferably comprises a plurality of neighbor network devices, i.e. network devices belonging to the neighboring network, and can also be based on any radio frequency technology and protocol like Wi-Fi, Thread, Bluetooth, Cellular device2device communication, V2X protocol, Zigbee, ESP-now etc. However, the neighboring network can also comprise only the neighbor network device.

The neighboring network information providing unit can be a storing unit in which the neighboring network information is stored already and from which the neighboring network information can be retrieved. Also, the neighboring network information providing unit can be a retrieving unit for retrieving the neighboring network information from, for instance, a network device having received communication signals from a neighboring network, wherein the neighboring network information providing unit is then adapted to provide the received neighboring network information. The neighboring network information providing unit can also receive the neighboring network information, for instance, by a user input received from an input device being part of the network or from a user input device that can communicate in any other way with the neighboring network information providing unit. For instance, the input device can be a phone that can communicate with the neighboring network information providing unit via Bluetooth. Moreover, the neighboring network information providing unit can be adapted to control a network device, preferably, a network device at the edges or periphery of the network and/or at the edges or periphery of the detection area to perform a scanning process for detecting a neighboring network and to provide information based on the detection of the neighboring network. For instance, during the scanning process the network can be adapted to send communication signals, for instance, on other communication channels or from other communication protocols, and can be adapted to determine based on received returning signals from another network device, in particular, a neighbor network device, information on the other network, i.e. the neighboring network.

The neighboring network information can refer to any information on the neighboring network, can refer to a characteristic of a neighboring network like the communication protocol used by the neighboring network, e.g. whether the neighboring network is a Wi-Fi, Thread, Bluetooth, ESP-now or Zigbee network, a communication channel used by the neighboring network, a security protocol used by the neighboring network, e.g. if the neighboring network is an open network or a closed network, information on one or more positions of the neighbor network devices of the neighboring network, which types of devices the neighboring network comprises, in which state one or more of the neighboring network devices are, an identification of the network, like a personal area network ID of a Zigbee network, a network key of the neighboring network, a criticality of a neighbor network device for the task performed by the network, etc. Preferably, the neighboring network information comprises information that allow to determine a possible way of communicating with at least one of the neighbor network devices. For example, the information on the type of device can be used to identify a neighbor network device with which a reliable communication might be possible, for instance, if the information indicated that one of the neighbor network devices is battery powered, a communication with this device might be considered unreliable.

The network controlling unit is adapted to control the at least one network device based on the provided neighboring network information such that the at least one network device of the network is enabled to detect a signal useable for radio frequency sensing in a detection area extending outside of the detection area of the network and/or for radio frequency sensing in the detection area of the network itself. In particular, the neighboring network information provides information that allows the network controlling unit to determine which signals might be provided by a neighbor network device that could be used for radio frequency sensing by the network device of the network controlled by the radio frequency sensing control device and how to get access to the respective signal. Therefore, the network controlling unit can control at least one network device of the network such that it is enabled to detect the signal, for instance, by searching for a communication signal from a neighbor network device on a channel specified in the neighboring network information, or by interacting with a neighbor network device such that the neighbor network device sends a respective signal to the network device, etc. Moreover, the network controlling unit can then be adapted to control the at least one network device such that the network device performs a radio frequency sensing based on the detected signal transmitted by the at least one neighbor network device for occupancy detection in a detection area extending outside of the detection area of the network and/or for radio frequency sensing in the detection area of the network itself.

In an embodiment, the network controlling unit is adapted to control the at least one network device such that it determines a signal quality characteristic of a communication signal of the at least one neighbor network device and uses the signal quality characteristic for radio frequency sensing. The signal quality characteristic can refer to any feature of a communication signal received from the neighbor network that is indicative of a quality of the signal. Preferably, the signal quality characteristic can refer to a signal strength of a communication signal of the at least one neighbor network device and/or a channel state information of a communication signal of the at least one neighbor network device. In particular, the signal strength of communication signals of the at least one neighbor network device can refer to the received signal strength indicator (RSSI) determined for the respective communication signal. For Wi-Fi applications it is particularly preferred that the channel state information (CSI) of the communication signal received by the network device is used for radio frequency sensing. However, in other embodiments the signal quality characteristic can also refer to other metrics of the communication signals transmitted by the at least one neighbor network device and received by the network device of the network controlled by the radio frequency sensing control device.

In an embodiment, the network controlling unit is adapted to control the at least one network device based on the provided information such that it is enabled to interact with at least one of the neighbor network devices, and the network controlling unit is adapted to control the at least one network device to perform the radio frequency sensing based on the interaction with the at last one interacting neighbor network device. The interaction between the at least one network device and the at least one neighbor network device can refer to any kind of interaction defined by the exchange of signals between the network device and the neighbor network device. A signal exchange can refer, for instance, to one of the devices providing a communication signal and the other network device providing a return or answer signal based on the communication signal. The network controlling unit can then be adapted to control the network device to perform the radio frequency sensing based on the interaction, i.e. the exchange of the signals, between the network device and the interacting neighbor network device. In particular, the network controlling unit can be adapted to control the at least one network device to perform the radio frequency sensing based on a signal transmitted by the interacting neighbor network device and received by the network device that is part of the interaction of the two devices.

In a preferred embodiment, the network controlling unit is adapted to control the at least one network device to interact with the at least one neighbor network device by sending a trigger message to the at least one interacting neighbor network device and to use the return signal of the at least one interacting neighbor network device for radio frequency sensing. The trigger message can be any message that according to the network protocol used by the interacting neighbor network device causes the interacting neighbor network device to transmit a signal that can be used for radio frequency sensing in a detection area outside the detection area of the network. In particular, the network controlling unit can be adapted to determine based on the neighboring network information which trigger signal would allow to receive a return signal from a neighbor network device that allows a radio frequency sensing in a detection area extending outside of the detection area of the network. Based on this determination the network controlling unit is then adapted to control the at least one network device to send the trigger message to the at least one interacting neighbor network device. The at least one network device can then use the parameters of the return signal, for instance, a metric of the return signal, a content of the return signal or both, for radio frequency sensing, in particular, occupancy detection, in a detection area extending outside the detection area of the network, in particular, a detection area between the sensing network device and the interacting neighbor network device.

In an embodiment, the network controlling unit is adapted to control the network device to send the trigger message to a common communication platform, preferably a cloud storage, from which the trigger message can be retrieved by at least one neighbor network device having access to the common communication platform. In this case the trigger message can also be used as controlling message for the neighboring network controlling the communication characteristics of the neighboring network. Also the network controlling unit can be adapted to send the trigger message itself.

In an embodiment, the trigger signal is chosen such that the return signal of the at least one interacting neighbor network device is indicative of its connections to other neighbor network devices of the neighboring network and/or of its connections to one or more network devices of the network. Preferably, the return signal of the at least one interacting network device comprises information on its connections to other neighbor network devices of the neighbor network and/or its connections to one or more network devices of the network, like reliability information, metrics of the connections to the other network devices, position information of the other network devices, type of the other network devices, etc. Preferably, the return signal comprises signal quality characteristics of the signal quality of a communication signal received by the neighboring network. For instance, the return signal can be indicative of a signal strength of a communication signal received by the neighbor network device that was sent by another neighbor network device or by a network device of the network controlled by the radio frequency sensing control device. If the neighboring network is based on a Zigbee communication protocol, the return signal can refer to a neighbor table according to the Zigbee communication protocol. The network controlling unit can then be adapted to control the at least one network device to perform radio frequency sensing also based on the information provided by the interacting neighbor network device referring to the connections to other neighbor network devices, in particular, by recording a change in the connections to other neighbor network devices between two return signals containing the information on the connections to the other neighbor network devices. In this embodiment, it becomes possible for the network device to not only perform radio frequency sensing between the interacting neighbor network device and the network device but also in an area defined by the communication between the interacting neighbor network device and the neighbor network devices communicating with the interacting neighbor network device. Thus, the possible detection area for the radio frequency sensing of the network can be increased very effectively into an area occupied by the neighbor network devices.

In a preferred embodiment, the return signal is indicative of changes of the signal quality characteristics of the connections of the at least one interacting neighbor network device to other neighbor network devices of the neighboring network and/or its connections to one or more network devices of the network during a predetermined past time period. For instance, the return signal can comprise measured signal strengths of the connections of the at least one interacting neighbor network device to the other neighbor network devices and/or with at least one network device of the network during a predetermined past time period, wherein this sequence of signal strengths is indicative of changes of these signal strengths. The predetermined past time period can refer, for instance, to the last few seconds or minutes and can also be defined, for instance, by defining a number of past signal strengths measurements that should be provided. For instance, the return signal can refer to a neighbor table comprising the last ten measurements of signal strength between the interacting neighbor network device and each of the neighbor network devices being part of the neighbor table.

In an embodiment, the network controlling unit is adapted to control the network device to perform a radio frequency sensing for the predetermined past time period based on the changes of the signal strengths of the connections between the at least one interacting neighbor network device and the connected neighbor network devices of a neighboring network during the predetermined past time period. Since the return signal is indicative of changes of the signal strengths of the connections of the at least one interacting neighbor network device to other neighbor network devices, the network device can be controlled by the network controlling unit to use this information on the changes of the signal strength for performing a radio frequency sensing based on this information for the predetermined time period to which these changes refer. This embodiment allows, for instance, to check if a current detection result of the sensing network device is in conformance with a detection result of a previous time period in an area of the neighboring network. An application example for this is a situation in which the sensing network device senses the presence of a potentially unauthorized person in a peripheral area of a garden next to a garden of a neighbor, wherein this area can only be reached by passing through the garden of the neighbor. In such a configuration it would be advantageous to check whether indeed also an occupancy, i.e. a passing of a person, can be detected in the garden of the neighbor in the time before the occupancy detection in the garden of the sensing network device indicating that the occupancy detection of the network device in the periphery is correct.

In an embodiment, the network controlling unit is adapted to control the at least one network device such that it listens for network maintenance messages or other messages used for communicating between the network devices of the neighboring network, wherein the network controlling unit is then adapted to control the network device to perform a radio frequency sensing based on the received messages. Network maintenance messages can refer to any kind of message that is used to maintain or build a network of network devices. Preferably the device can be configured by the network controlling unit to listen passively for all communication messages provided by the neighbor network devices and to use the received messages for radio frequency sensing.

In an embodiment, the network controlling unit can also be adapted to control the network device such that a trigger message is sent that prompts a neighbor network device to send maintenance messages or other messages used for communicating between the network devices of the neighboring network to the network device. In a preferred embodiment, the trigger signal is a beacon request signal and the network maintenance message refers to a response to the beacon request. In another preferred embodiment, the network maintenance message can also refer to a link status message, a keep-alive message or Wi-Fi pinging message. The network device can then be adapted to use the RSSI or the CSI of the network maintenance messages for radio frequency sensing. However, also the content or other metrics of the network maintenance message can be used for radio frequency sensing.

In an embodiment, the network controlling unit is adapted to control the at least one network device to interact with at least one neighbor network device by entering and becoming at least partially part of the neighboring network and to perform radio frequency sensing as part of the neighboring network, wherein the network controlling unit is further adapted to control the at least one network device to report the results of the radio frequency sensing performed as part of the neighboring network. Preferably, in this embodiment the neighboring network information provided by the neighboring network information providing unit comprises information on whether the neighboring network is an open network or a closed network or comprises security measure information and network identification information such that the network controlling unit can control the at least one network device to become at least partially part of the neighboring network based on this neighboring network information. The at least one network device can then request to become a full member of the neighboring network or to become a partial member, for instance, a member of the network that has only partially access to the network resources and network communication. The network device can then perform radio frequency sensing as part of the neighboring network and thus in a detection area of the neighboring network and in a detection area between the neighboring network and the at least one network device. The results can be reported to the radio frequency sensing control device and/or can be reported to other network devices of the network, for instance, by broadcasting the results into the network. Alternatively, the network device can also use other communication channels, like communicating via Bluetooth with at least one network device, communicating with a cloud server to which also the other network devices of the network have access and can retrieve the information, etc.

For becoming part of the neighboring network the network device can be controlled to leave its present network. However, preferably, the network controlling unit is adapted to control a network device that is capable of being part of two networks at the same time. In this case the network device can be controlled by the network controlling unit to become part of the neighboring network and to perform radio frequency sensing as part of the neighboring network, while at the same time still taking part in the network comprising the network controlling unit and reporting the results of the radio frequency sensing as part of the network. The capability of becoming part of two networks at the same time can be implemented by providing two radios or a single radio with sufficiently capable firmware to be part of both networks.

Preferably, the network controlling unit is adapted to control the at least one network device such that it becomes part of the neighboring network only for a predetermined time period, wherein the network controlling unit is further adapted to control the at least one network device to report the results of the radio frequency sensing during the predetermined time period after the network device has become part of the network again. After the predetermined time period has passed the network device can be adapted to automatically leave the neighboring network and request to be again part of the network, i.e. the network controlled by the radio frequency sensing control device. The network controlling unit can then control the at least one network device to report the results of the radio frequency sensing processed as part of the neighboring network. Alternatively, the network controlling unit can be adapted to provide a control trigger signal or to control one of the network devices of the network to provide a control trigger signal that triggers the at least one network device being currently part of the neighboring network to change networks again and to request to again be part of the network controlled by the radio frequency sensing control device. In an alternative embodiment, the network controlling unit can be adapted to control the at least one network device to interact with at least one neighbor network device by entering and becoming part of the neighboring network for an undetermined time period and to report the results of the radio frequency sensing performed within the neighboring network to the network controlled by the radio frequency sensing control device while still being part of the neighboring network. The at least one network device can be controlled, for instance, to report the results of the radio frequency sensing in predetermined time periods, for instance, every few seconds, or can be controlled to report the results of the radio frequency sensing only when provided with a predetermined trigger message.

In an embodiment, the network controlling unit is adapted to control the at least one network device based on the provided information such that the network device transmits a control trigger message that is able to control at least one of the neighbor devices to change a timing of communication signals used for communication within the neighboring network, and to control the at least one network device to use the communication signals of the neighboring network for radio frequency sensing. The control trigger message can be any message implemented in the used communication protocol of the neighbor network devices causing at least one of the neighbor network devices to change a timing of transmitting communication signals within the neighboring network. For instance, the control trigger message can be implemented and chosen such that the timing of changing network maintenance messages, like link status messages, are changed within the neighboring network. Preferably, the timing of the communication signals is changed such that the communication signals are sent more often during a time interval to allow for a more accurate radio frequency sensing with higher time resolution.

In an embodiment, the neighboring network information providing unit is adapted to provide as information on the neighboring network a network channel on which a network device can communicate with the neighboring network, wherein the network controlling unit is adapted to control at least some, preferably all, of the network devices of the network to also communicate on the network channel provided by the neighboring network. In a preferred embodiment, the network channel refers to the network channel on which the neighboring network itself communicates. Alternatively, the network channel refers to a dedicated network channel provided by the neighboring network for communication with network devices outside of the neighboring network, for instance, to a guest network channel or a dedicated radio frequency sensing channel. Controlling the network devices of the network controlled by the radio frequency sensing control device to communicate, i.e. to send communication messages on the same network channel as a neighboring network, has the advantage that controlling at least one network device of the network to become part of the neighboring network is much easier. Moreover, also using the communication signals transmitted within the neighboring network and received by the at least one network device for radio frequency sensing becomes easier.

In another aspect of the invention, a network is presented, wherein the network comprises a) at least two network devices, wherein at least one network device is adapted to perform radio frequency sensing in a detection area of the network, and b) a radio frequency sensing control device as described above.

In another aspect of the invention, a radio frequency sensing control method for controlling radio frequency sensing in a network comprising at least one network device is presented, wherein at least one of the network devices is adapted to perform radio frequency sensing in a detection area of the network based on the communication signals transmitted within the network, wherein the radio frequency sensing control method comprises a) providing information on a neighboring network, wherein the neighboring network comprises at least one neighbor network device neighboring at least one network device of the network and b) controlling the at least one network device based on the provided neighboring network information such that the network device of the network is enabled to detect a signal usable for radio frequency sensing in a detection area extending outside of the detection area of the network and/or for radio frequency sensing in the detection area of the network, wherein the detected signal is transmitted by at least one neighbor network device.

In another aspect of the invention, a computer program for controlling a radio frequency sensing in a network is presented, wherein the computer program comprises program code means for causing the radio frequency sensing control device as described above to carry out steps of the radio frequency sensing control method as also described above when the computer program is executed by the device.

It shall be understood that the radio frequency sensing control device discussed herein, the network discussed herein, the radio frequency sensing control method discussed herein, and/or the computer program discussed herein can have similar and/or identical preferred embodiments, in particular, as provided herein.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
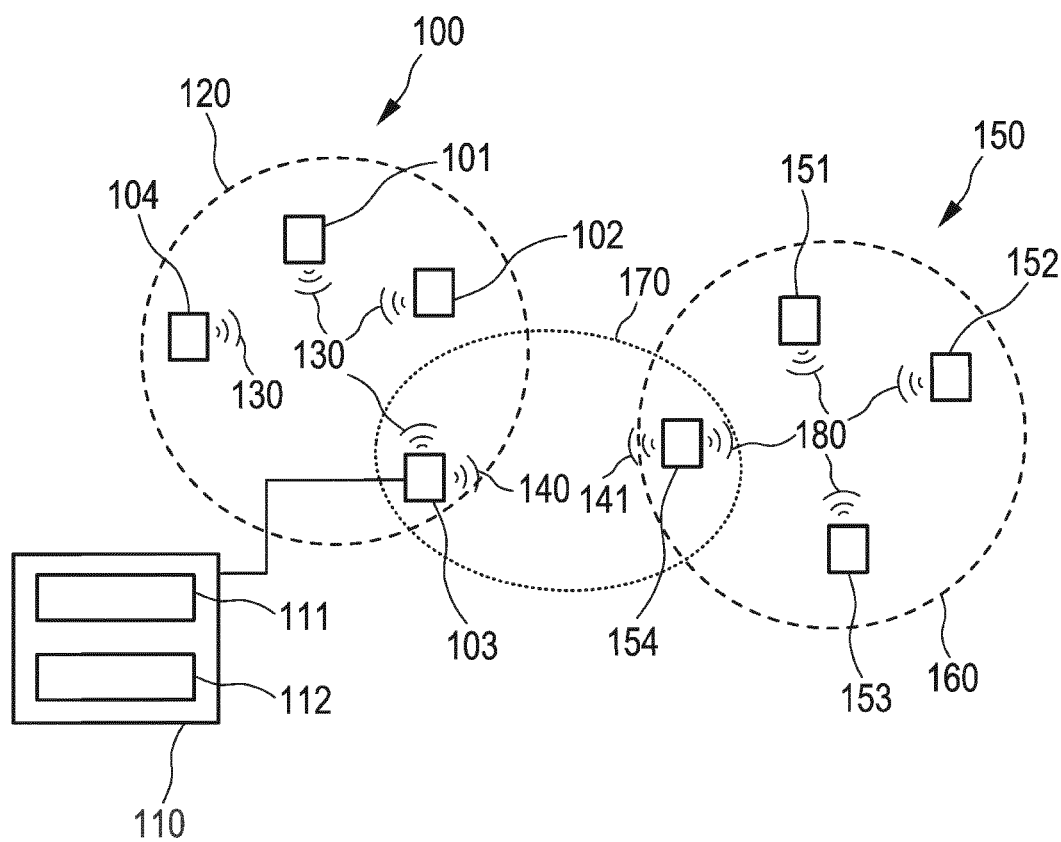
FIG. 1 shows schematically and exemplarily an embodiment of a network of a plurality of network devices comprising a radio frequency sensing control device according to the invention.

FIG. 1 shows schematically and exemplarily an embodiment of a network with a plurality of network devices comprising a radio frequency sensing control device. The network 100 is formed by network devices 101, 102, 103 and 104 communicating with each other and maintaining the network 100 via communication signals 130, wherein the communication signals 130 are radio frequency signals. The network devices 101, 102, 103, 104 are preferably smart lighting devices, but can also refer to smart devices with other functional capabilities. The term "smart" refers in this context to devices that provide in addition to their main functionality, for instance, the functionality of providing light for lighting devices or sensing a temperature for a temperature sensor, also additional functionalities referring, in particular, to network communication functionalities, control functionalities, etc. At least one of the network devices 101, 102, 103, 104 comprises as additional functionality a radio frequency sensing functionality, i.e. is adapted to perform radio frequency sensing in a detection area 120 of the network 100. The detection area 120 is defined as the area in which the network devices being adapted for radio frequency sensing of the network 100 are able to perform the radio frequency sensing task given to the network, for instance, the task to sense the presence or absence of an object or a person, to determine an activity of an object or person, to detect breathing of a person, etc.

In this example, the network 100 is positioned near a neighboring network 150. The neighboring network 150 comprises neighbor network devices 151, 152, 153, 154 that communicate within the neighboring network 150 by using communication messages 180, for instance, to maintain the neighboring network 150. In this example, also at least one of the neighbor network devices 151, 152, 153, 154 comprises a radio frequency capability, i.e. is adapted to perform radio frequency sensing in a detection area 160. The detection area 160 is in this example also defined as area in which the neighbor network devices that comprise the ability of radio frequency sensing can detect the presence or absence of an object, like a person. In other embodiments, the neighbor network devices of the neighboring network 150 are not capable of performing radio frequency sensing by themselves. Preferably, also the neighbor network devices 151, 152, 153, 154 are smart lighting devices. However, the neighbor network devices 151, 152, 153, 154 can also refer to smart devices with other functional capabilities as described with respect to the network devices 101, 102, 103, 104 of network 100.

The network 100 further comprises a radio frequency sensing control device 110 adapted to control the presence detection using radio frequency sensing of the network 100. In particular, the radio frequency sensing control device 110 can be adapted to control at least one of the network devices 101, 102, 103, 104 of the network 100. Preferably, the radio frequency sensing control device 110 can be adapted to control all of the network devices 101, 102, 103, 104 of the network 100. The radio frequency sensing control device 110 can be part of one of the network devices 101, 102, 103, 104 of the network 100, for instance, can be provided as hardware or software within a housing of the network device. Alternatively, the radio frequency sensing control device 110 can be part of all or a part of the network devices 101, 102, 103, 104, for instance, such that the functionalities of the radio frequency sensing control device 110 are performed by the network devices 101, 102, 103, 104 together, i.e. by an interaction between network devices 101, 102, 103, 104. In another alternative, the radio frequency control device 110 can be a standalone device, for instance, can itself be a network device, comprising the hardware and software for providing the functionalities of the radio frequency sensing control device 110 and being in communication with at least one of the network devices 101, 102, 103, 104. In the example shown in FIG. 1, the radio frequency sensing control device 110 is connected to network device 103 of network 100 comprising a radio frequency sensing capability.

The radio frequency sensing control device 110 comprises a neighboring network information providing unit 111 and a network controlling unit 112. The neighboring network information providing unit 111 is adapted to provide information on a neighboring network, in this example, on neighboring network 150. For instance, the neighboring network information providing unit 111 can provide, as neighboring network information, information that was determined based on communication signals 180 used within the neighboring network 150 and that has been received by the network device 103. These communication signals 180 can, for instance, provide information on the communication protocol used by the neighboring network 150, the communication channel used by the neighboring network 150, an identification or a security key used by the neighboring network 150, whether the neighboring network 150 is an open or a closed network, etc. The neighboring network information providing unit 111 can then be adapted to extract or determine this information from the received communication signals 180.

In another embodiment, the neighboring network information providing unit 111 can also be adapted to control the network device 103 to actively scan for a neighboring network, in particular, to transmit trigger messages that cause each potential neighbor network device to respond and to provide information on the neighboring network to which it belongs. In this case, network device 103 would provide a trigger message 140 which would be received by neighbor network device 154 of neighboring network 150, wherein the trigger message 140 causes the neighbor network device 154 to transmit a network information message 141 containing, for instance, information on the neighboring network 150 that can be received by the network device 103.

The neighboring network information providing unit 111 can also be adapted to receive the neighboring network information based on an input of a user using, for instance, an input unit also being in communication with the radio frequency sensing control device 110. Alternatively, the neighboring network information providing unit 111 can also receive the neighboring network information from a cloud storage in which the user has stored the neighboring network information. A cloud storage can also encompass a central storage, for instance, a network storage used by a plurality of devices for storing and exchanging data. In particular, neighboring network information directly provided by a user with the neighboring information providing unit 111 can refer to security information of the neighboring network 150, like a network password, a security key, etc. of the neighboring network 150.

The neighboring network information providing unit 111 can then provide this information as information on the neighboring network 150. The network controlling unit 112 is then adapted to control the network device 103 based on the provided neighboring network information provided by the neighboring network information providing unit 111. In particular, network controlling unit 112 is adapted to control network device 103 such that the network device 103 is enabled to detect a signal useable for radio frequency sensing in a detection area 170 extending outside of the detection area 120 of the network 100, wherein the detection signal is transmitted by one of the neighbor network devices 151, 152, 153, 154. For instance, if the neighboring network information indicates that the neighboring network 150 provides its communication signals 180 on the same communication channel as the communication signals 130 used in the network 100, the network controlling unit 112 can be adapted to control the network device 103 to use the communication signals 180 of the neighboring network 150 received by the network device 103 for radio frequency sensing in detection area 170. Alternatively, if the neighboring network information indicates that the neighboring network 150 uses a specific communication protocol, like a Zigbee or Wi-Fi communication protocol, the network controlling unit 112 can be adapted to control the network device 103 to send trigger messages 140 in accordance with the network protocol to, for instance, neighbor network device 154 causing neighbor network device 154 to transmit a return signal 141 in accordance with the used communication protocol. The network controlling unit 112 can then be adapted to control the network 103 to use the return signal 141 for radio frequency sensing in the detection area 170.

In a further embodiment, if the neighboring network information indicates that the neighboring network 150 is an open network or that the credentials, like a security key, of the neighboring network 150 are known by the radio frequency sensing control device 110, for instance, due to an input of a user of the network 100, the network controlling unit 112 can be adapted to control network device 103 to become part of the neighboring network 150. In particular, the network controlling unit 112 can control the network device 103 to leave the network 100 and request to become part of the neighboring network 150 such that the network device 103 can perform radio frequency sensing, for instance, based on the communication signals 180, as part of the neighboring network 150. The network controlling unit 112 can then further either control the network device 103 to leave the neighboring network 150 after a predetermined time period and again join the network 100 or to report the results of the radio frequency sensing as part of the neighboring network device 150 to the network 100, for instance, to one of the other network devices 101, 102, 104 of the network 100, at predetermined time intervals or in response to a trigger message, while still staying part of the neighboring network 150.

Figure 2:
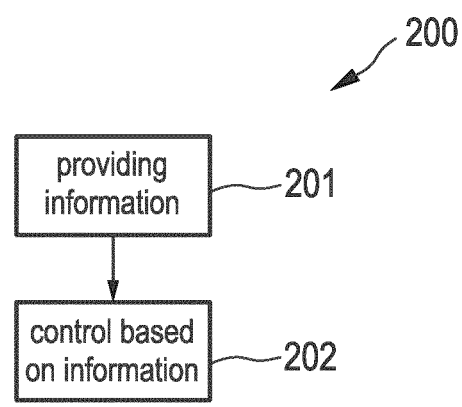
FIG. 2 shows a flow chart exemplarily illustrating an embodiment of a method for controlling presence detection using radio frequency sensing in a network.

FIG. 2 shows a flow chart exemplarily illustrating an embodiment of a method for controlling presence detection using radio frequency sensing in a network, for instance, network 100. In a first step 201 the method 200 comprises providing information on a neighboring network, like the neighboring network 150, wherein the neighboring network 150 comprises at least one neighboring network device 154 neighboring at least one network device 103 of the network 100. In a second step 202 at least one network device, for instance, network device 103 of network 100, is controlled based on the provided information such that the network device 103 of the network 100 is enabled to detect a signal 141, 180 for radio frequency sensing in a detection area 170 outside the detection area 120 of the network 100. The detection signal 141, 180 is transmitted by at least one neighbor network device 151, 152, 153, 154.

In the following, more detailed examples of preferred embodiments and applications of the invention generally described above are provided.

Figure 3:
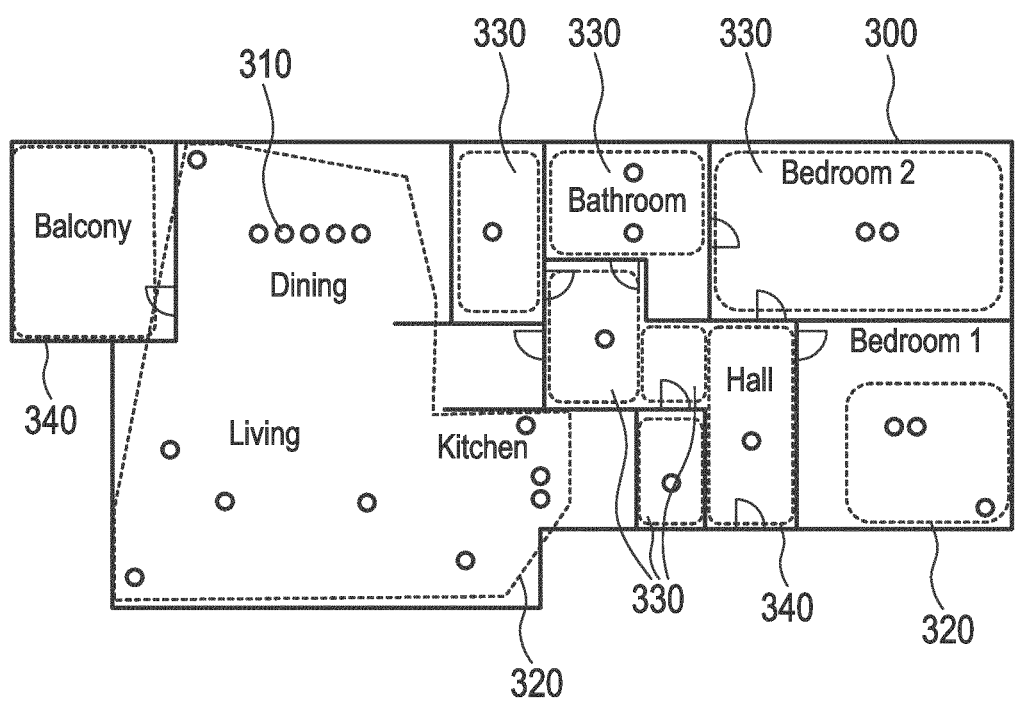
FIG. 3 and FIG. 4 show schematically and exemplarily an application of the invention.

FIG. 3 shows one example of a typical application of the invention. In the figure, a typical apartment 300 is shown. The apartment comprises a plurality of rooms, like a dining room, a bathroom or a bedroom. In each of these rooms network devices 310 indicated in the figure by points are provided, wherein the network devices can be smart lighting devices. However, the network devices 310 can also refer to network devices with other functionalities, like sensor devices or controlling devices. The network devices provided in one room form a network in this example. For instance, the network devices 310 provided in the living room form a network, the network devices provided in the first bedroom form a network, the network devices in the second bedroom form a network and also the network device, for instance, provided in the hall forms a network, although in the hall only one network device is provided. Thus, the network of the hall refers to a network comprising only one network device. In this example, the areas 320 in the living room and in the bedroom comprise enough network devices 310 with a distribution that allows for a very good coverage of radio frequency sensing performed by the network devices in these areas. However, the areas 330 and 340 comprise too few or too unevenly distributed network devices to provide an accurate and reliable radio frequency sensing by the network devices in the respective area. This might constitute a problem if the radio frequency occupancy sensing should be used for controlling the network devices in a room, for instance, to turn on the light, if a person is detected in the room, or if the network devices should be used for security purposes. These security purposes might be, in particular, interesting for area 340 comprising the hall and the balcony of the apartment in which a present detection might allow, for instance, to turn on the light or to notify a resident of the apartment.

Figure 4:
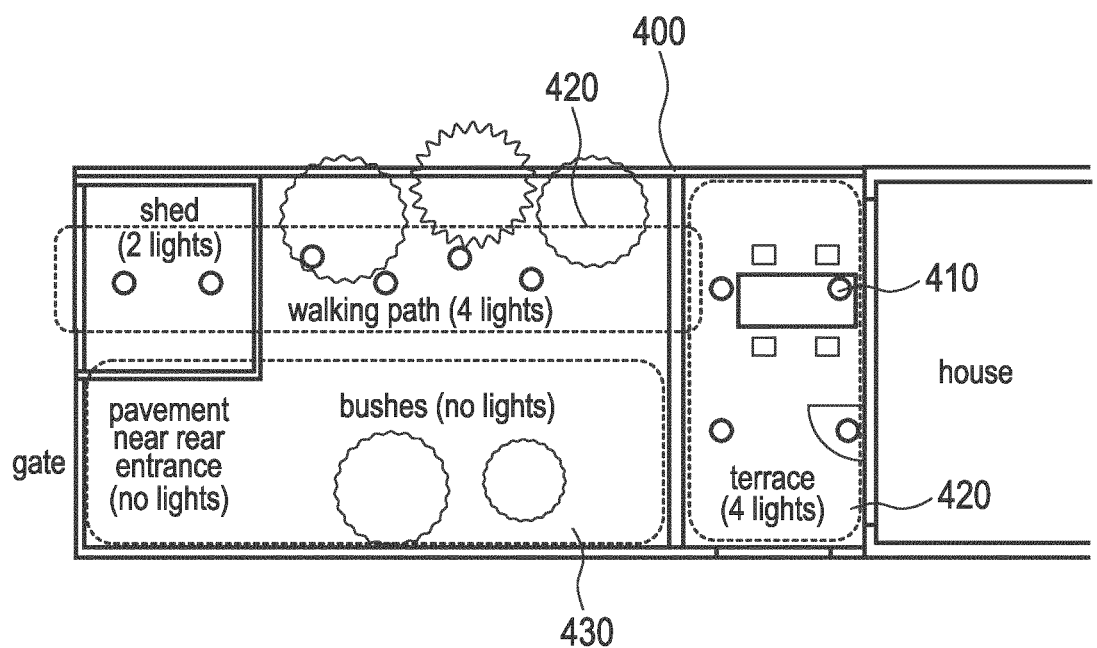

In FIG. 4 another example of a configuration in which the invention as described above can be applied is shown. In FIG. 4 a garden area 400 is shown in which network devices 410, in this example, smart lighting devices, are distributed. In particular, network devices 410 are provided at a terrace, a walking path and a shed in the garden. In this example, all lights provided in the garden can form a network, wherein in this case radio frequency sensing could be provided by the network devices with good results and high reliability in the areas 420 of the garden. However, in the area 430 at which no network devices are provided the radio frequency sensing will be unreliable or even not possible. Generally, occupancy detection in a garden using radio frequency sensing can result in unreliable results, since only a limited number of network devices, like smart lighting devices, are available in most gardens. For instance, a user might not even provide the preferable three network devices for a reliable radio frequency sensing. Moreover, network devices used in a garden, like smart lights, are commonly placed along walking paths in a garden or along a perimeter of the property, while they are probably not provided in other areas of the garden. Further, the lack of confinement in outdoor areas results in a limited number of reflections which in other applications could also be used for contributing to the radio frequency sensing. Thus, the lack of reflections can generally reduce the performance of radio frequency sensing in outdoor areas. In particular, in radio frequency sensing applications that are based on the analysis of signals referring to multi path signal transmissions, for instance, using a CSI measurement in a Wi-Fi communication protocol, this lack of reflection can lead to a further decrease of the reliability of the presence detection.

In both environments exemplarily shown in FIGS. 3 and 4, applying a radio frequency control device as described exemplarily with respect to FIGS. 1 and 2 allows to increase the detection area of the network devices, for instance, to the areas with an unreliable radio frequency sensing by utilizing, in addition to the radio frequency signals provided by the network devices belonging to a specific network, also signals provided by network devices that do not belong to the network, in particular, belong to a neighboring network. The neighboring network can be, for instance, in the application shown in FIG. 3, any of the networks provided, for instance, in a neighboring room. For example, high accuracy for radio frequency sensing in the second bedroom might be achieved by further taking into account radio frequency signals provided by the network devices in the first bedroom, the hall and/or the bathroom. In the second exemplary application shown in FIG. 4, the neighboring network for the network shown in the garden might refer to a network of a neighbor also providing network devices in the neighboring garden. If a corresponding neighboring network is available, for instance, in the neighboring garden, the region 430 shown in FIG. 4 for which, based on the setting of the network shown in FIG. 4, no radio frequency sensing is available, might be covered by signals provided by the neighboring network devices and the own network devices such that an improved, for instance, more reliable, radio frequency sensing can be performed in the area 430.

In accordance with the general embodiments of the invention described above, it is proposed to use a hybrid radio frequency sensing mode for radio frequency sensing. In particular, a first set of network devices, for instance, lights, in a network, for instance, a Philips Hue network, is provided that are under a direct control of an owner of the network, i.e. in particular, an owner of the network devices. The network devices of the network capable of radio frequency sensing can then, in accordance with the above described embodiments of the invention, interact with a second set of network devices, for instance, also lights, which are part of another network, in particular, a neighboring network, that might be owned by a neighbor or somebody else for improving the radio frequency detection of the network. The neighbor network devices being part of a neighboring network can refer, for instance, to a neighbor's Wi-Fi lights, to a neighbor's Zigbee lights, to a Zigbee enabled Smart Meter owned by an electrical utility, to a combination of Wi-Fi and Zigbee lights both owned by a neighbor, to a neighbor's Wi-Fi access point, to a public Wi-Fi infrastructure of the city, to Zigbee enabled street lighting poles owned by an electrical utility company or the city government, and/or to emergency lights, sensors, thermostats, etc., used in hallways, staircases emergency exits, or any other shared areas in an apartment building that are typically owned/maintained by a landlord or building manager.

Using the signal of such neighbor network devices not being part of the own network allows to improve the radio frequency sensing performance of the own network. For instance, by utilizing the neighbor network devices, for instance, lights, in the neighbor's apartment on the above and below floors the own network might be enabled to perform vertically oriented radio frequency sensing by creating a sensing volume from the ceiling to the room's floor. In addition, also by using neighbor network devices belonging to a neighboring network in a neighbor's apartment located on the same floor the sensing performance of the own network close to shared walls between the apartments and/or near an entrance area of the two apartments may be improved.

Using neighbor network devices, like lights, from a neighboring network provided in an adjacent room might in many cases be good enough to determine whether a suspected, but not confirmed, false positive detection in a room is really caused by what is happening in the room or, for instance, by a disturbance in the adjacent room, for instance, in an adjacent neighbor's room. For example, network devices provided in a network in a living room of a user might detect disturbances via radio frequency sensing which could be caused by the presence of someone in the living room. To confirm that someone is indeed present in the living room, the network provided in the living room can, for instance, by providing the radio frequency sensing control device as described with respect to FIG. 1, at least temporarily involve the signals provided by neighbor network devices of a neighboring network provided in a neighboring room that is close to the living room for radio frequency sensing. If based on the signals provided by these neighbor network devices the disturbance in the radio frequency sensing is measured to be larger, the network might be adapted to conclude that it is more likely that someone is indeed present, for instance, moving, in the neighboring room and not in the living room.

Generally, a first group of network devices, like lights, being part of a first network can perform radio frequency sensing as generally known. For example, if the first network is based on a Wi-Fi communication protocol, the radio frequency sensing can utilize a distributed radio frequency sensing architecture in which all Wi-Fi network devices are considered equally with respect to the radio frequency sensing. In this example, the Wi-Fi radio frequency sensing does not require the involvement of a central node, i.e. a central network device, such as a Wi-Fi access point which can be prone to failure. Generally, a Wi-Fi communication protocol used by the network devices can refer to a classic Wi-Fi communication protocol or a Wi-Fi mesh communication protocol. The first network can then further comprise the radio frequency sensing control device as described above to extend the radio frequency sensing capabilities of the network in accordance with the invention.

In an example, a second group of network devices, i.e. a neighboring network, that are owned, for instance, by a neighbor of the user of the first network, might not provide sufficient computing resources or may be based on a Wi-Fi radio communication protocol such that an analyzing of the communication signals, for instance, to provide the raw CSI data that is necessary for the performance of radio frequency sensing, might not be possible for the second group of network devices. In this case, the second group of network devices may rely for the radio frequency sensing calculations on some network device that might be positioned elsewhere, for instance, an anchor node. If the network owned by the neighbor comprises a radio frequency sensing control device according to the above invention, such an anchor node may be provided as part of the first group of lights of the first network, for instance, by the Wi-Fi access point or one of the Wi-Fi network devices. The radio frequency sensing control device of the first network can then, for instance, control the anchor node to interact with at least one of the network devices of the second group of lights being part of the neighboring network and having themselves not the resources to perform radio frequency sensing. In such an example, the radio frequency sensing resulting from the interaction of the two networks is not performed in a fully distributed fashion. Preferably, the radio frequency sensing application is provided on the Wi-Fi network devices of the first group of network devices, while the second group of network devices of the neighboring network, which do not have radio frequency sensing capability, are only capable to interact as standard Wi-Fi nodes. In particular, in such an embodiment, it is not necessary that the network devices of the first network or of the second network, i.e. the network devices owned by the neighbor, have consented to take part in the radio frequency sensing of the first group of network devices.

In an example, the radio frequency sensing control device can be adapted to control one of the network devices of the first group of network devices referring, for instance, to Wi-Fi lights, to leave the first Wi-Fi network and to temporally join the second Wi-Fi network, for instance, the neighbor's Wi-Fi network, to perform a radio frequency sensing scan, for instance, if the second Wi-Fi network is a public or open Wi-Fi network. Such an approach for utilizing the radio frequency sensing control device according to the invention may preferably be used when the network is in an "owner-out-of-home-mode" and based on the radio frequency sensing it is suspected that an unauthorized person, like a burglar, might be within the house. In such an application, after the network device having temporally become part of a neighboring network has completed a radio frequency scan of an extended detection area based on the signals provided by the neighbor network devices, for instance, the neighbor Wi-Fi access point, the network device can again leave the neighboring network and re-join the first Wi-Fi network to report the results of the radio frequency scan. In particular, in case of a Wi-Fi communication protocol up to 1500 Wi-Fi messages per second can be utilized for a fast detection of human body movements. However, in this embodiment, during the radio frequency scan of the network device in the neighboring network, the network device is not reachable by the first network. However, this can be acceptable for this time period, since verifying whether an authorized person is present in the vicinity of the first network might have priority over other functionalities of the network, for instance, lighting control or lighting functionality. Such an embodiment is particularly interesting because public or open networks are present in many environments, for example, in the form of guest networks that can be configured in network routers to give free access to external users, for instance, by being password free, so that everyone can join. However, such a configuration might not provide access to some firewall blocked network devices. Another example refers to routers that provide a functionality for broadcasting two Service Set Identifiers (SSIDs), one SSID that can be configured to refer to a secured network and another SSID that can be configured to provide a public access, for instance, for users that also allow to use their access points. Thus, in many applications open or free networks are generally available for increasing a detection area of a network performing radio frequency sensing.

Although the above examples refer to a distributed radio frequency sensing architecture implemented based on a Wi-Fi communication protocol, also other radio frequency sensing protocols can be used by the network or the neighboring network in accordance with the invention. For instance, radio frequency sensing implemented on a Wi-Fi communication protocol, wherein only the Wi-Fi access point is aware of the radio frequency sensing, i.e. provides a radio frequency sensing capability, wherein the access point that can be regarded as being one of the network devices of the network provides trigger messages to other network devices without radio frequency sensing capability, wherein the access point can provide radio frequency sensing based on the return signals of the other network devices being part of the network of the access point. In such an embodiment, the radio frequency sensing control device can be adapted, for instance, such that the network controlling unit controls as at least one network device the access point, or such that the network controlling unit is adapted to control one of the network devices such that it interacts with the access point of a neighboring network.

If in an embodiment the network is based on a Zigbee communication protocol, the radio frequency sensing control device can be adapted to control the at least one network device to change its status in the Zigbee network from Zigbee router to Zigbee end device for interacting with neighbor network devices. This is particularly useful, since it allows the network device that is interacting with the neighbor network devices to devote more time, bandwidth and processing capability to interact or listen to the neighbor network devices.

Generally, the neighboring network and also a neighbor network device might communicate, i.e. send communication signals, on a radio frequency channel that is different from the radio frequency channel used by the network controlled by the radio frequency sensing control device. Moreover, in a preferred embodiment, the network controlling unit can be adapted to control at least one network device, for instance, a battery powered network device, to act as Zigbee end device with respect to the network using a Zigbee communication protocol and at the same time to be part of a neighboring network as a regular Zigbee device, i.e. a Zigbee router or a Zigbee end device, with respect to the neighboring network that is also based on a Zigbee communication protocol. The network device can then perform the radio frequency sensing as part of the neighboring Zigbee network and at the same time report the results of the radio frequency sensing as Zigbee end device to the network controlled by the radio frequency sensing control device.

In another exemplary embodiment, the network controlling unit can be adapted to control the at least one network device to send a trigger message to a neighbor network device, to which the neighbor network device is obliged by the communication protocol or standard used by the neighbor network to reply, i.e. to send a return message, wherein the return message can even be a message referring to asking what the trigger message means, or can even be an error message indicating that the trigger message was not understood and/or supported by the neighbor network device. The network controlling unit can be adapted to determine the trigger message that might be useful for triggering a return message by the neighbor network device based on the neighboring network information provided by the neighboring network information providing unit. For instance, useful trigger messages can be stored in the network controlling unit depending on information about which network communication protocol is used by a neighboring network. The network controlling unit can then be adapted to control the network device to determine the RSSI of the return message for radio frequency sensing. A possible trigger message/return message pair can be the beacon request/response pair of a communication protocol. Moreover, also other trigger message/return message pairs could be used, wherein such pairs can even be newly implemented in hardware or software of network devices or can be newly introduced into a communication protocol of a network. For instance, it can be implemented by hardware or software that a network device, for instance, a Hue light, replies to an InterPAN communication comprising a specific trigger message by providing a short return message that is particularly useful for radio frequency sensing. Such a trigger message/return message pair can be implemented independently of a specific communication protocol into a network device. In case of Wi-Fi, Beacon Frames can be used, which refer to periodic pings which a router/access point can send at a configurable rate. Independently on whether a device is part of a network or not, these Beacon Frames are received by all devices within range in the area. Generally, the Beacon Frames are used to indicate the presence and/or network characteristics of a network being generated by the router or access point. Thus, in Wi-Fi applications these messages can be used also for radio frequency detection.

In an embodiment, the network controlling unit can be adapted to control the network device such that it employs an ESP-now protocol for communicating with the neighbor network device and to utilize the ESP-now return messages for radio frequency sensing. The ESP-now protocol refers to a communication protocol developed by Espressif to enable a communication between multiple network devices without using the Wi-Fi protocol, wherein the ESP-now protocol allows for a direct and low-power communication using the same 802.11 radio. In an example, if a network utilizing a Wi-Fi communication protocol is provided in a garden, wherein one neighboring device is placed outside of the reach of the Wi-Fi network, the network controlling unit can be adapted to control one of the network devices near the neighboring device to use the ESP-now protocol to communicate with the neighboring network device to provide messages that can be used for radio frequency sensing. Moreover, also other network protocols providing the same functionality as ESP-now can be utilized accordingly.

An embodiment using a trigger message/return message pair for radio frequency sensing can be particularly useful in applications using network devices comprising a Zigbee radio capability, for instance, Smart Meters, or streetlights. Moreover, this embodiment can also be useful in Wi-Fi radio frequency sensing if the neighbor network device comprises a Wi-Fi radio capability, wherein, for instance, network devices belonging to a public Wi-Fi infrastructure house on lighting poles within inner cities may be used. Such public Wi-Fi routers or access points are in many applications available at regular distances in an inner city such that using these network devices provided outside a home in which a network is provided allow to cover parts of an area around the house provided with a network, like the front of the home or the garden, that are especially interesting for security proposes.

The radio frequency sensing control device can also be adapted, for instance, with respect to all embodiments described above or in the following, to further provide a privacy securing unit that is adapted to manage security measures with respect to the interacting of the at least one network device with the at least one neighbor network device and/or with respect to the radio frequency sensing results obtained based on the signal detected from the neighbor network device. Since in the mentioned application network devices belonging to a first person might interact with network devices belonging to another person or with public network devices, providing security measures can become important for the acceptance of such interactions by the users. For example, the security management unit can be adapted to control the radio frequency sensing between the two networks such that it is not possible to get information from the radio frequency sensing about activities in the neighbor's rooms so that the results of the radio frequency sending cannot be used with malicious intent. In an exemplary embodiment, the security management unit can be adapted to provide privacy setting to a user, for instance, via a display, wherein in the privacy settings the user can agree that his/her network devices are allowed to provide trigger messages and to respond to trigger messages provided by a neighbor network device also using a radio frequency sensing control device. Such settings can, for instance, be provided on a basis of reciprocal benefit, "I help you, if you help me". Moreover, the security management unit can also be adapted to provide different radio frequency sensing modes that may be enabled, for instance, at different times. For example, in certain times and in certain configurations a basic occupancy detection, a fall detection, a people counting detecting or a breathing detection might be available based on different security settings and different interactions between the network and the neighboring network. For instance, a radio frequency based breathing detection using the network and the neighboring network may only be allowed by the security management unit of the neighboring network and/or the network if the detection area of the neighboring network has been determined to be unoccupied, for instance, during the night. Further, the security management unit can also be adapted such that the usage of the neighbor network devices is only allowed for a predetermined amount of time, for instance, for ten seconds every two minutes, etc. This allows to increase the accuracy and reliability of the radio frequency sensing of the own network while at the same time it is prevented that privacy sensitive statistics on a user of the neighboring network can be gathered or that a negative effect of the radio frequency sensing on the performance of the neighboring network, for instance, due to additional bandwidth usage, can be noticed.

In the following some further preferred detailed embodiments of the invention are described. In an embodiment, the network devices and the neighbor network devices are already part of the same network at least for radio frequency sensing purposes, for instance, since the network controlling unit of at least one of the networks has controlled the network devices to join the neighboring network. In this case, the primary radio frequency sensing device, i.e. a network device of the network controlled by the radio frequency sensing control device, can send all kind of messages and get the responses from the secondary radio frequency sensing device, i.e. neighbor network device. The network device can then use the RSSI and/or CSI of that message sent by the neighbor network device. In such a case, radio frequency sensing can be provided, although the neighbor network device might not even be able to provide their own radio frequency reception results to the network. In contrast thereto, in a full-fledged radio frequency sensing system the body of the messages can carry the already previously recorded radio frequency reception results of other nodes. Therefore, in embodiments with two different networks, i.e. a network and a neighboring network, that only cooperate for radio frequency sensing, less data are available compared with one network performing radio frequency sensing within its own detection area.

If the own device, i.e. the network device controlled by the radio frequency sensing control device, and the neighbor network device are on two different networks, i.e. on the network and the neighboring network, in an embodiment the Zigbee credentials of both networks can be shared, for instance, as part of the neighboring network information. In such a case at least one network device can temporarily switch the communication channel, PAN and credentials and communicate with the neighbor network devices as part of the neighboring network and then switch back. Preferably, for this embodiment the network controlling unit is adapted to control the network devices such that both networks communicate on the same communication channel. Moreover, the network controlling unit can be adapted to control a network device that is capable of being part of two networks at the same time. In this case, the network device can be controlled to add the neighboring network as network and to be continuously part of both networks in parallel. Preferably, a network device can be used for interacting with a neighbor network device that is capable of managing two PAN's and corresponding network keys.

In an embodiment in which the neighboring network uses a Zigbee communication protocol or in which at least one neighbor network device is capable of Zigbee communication, the implemented Zigbee beacon request/response messages can be used for radio frequency sensing. The trigger message in the embodiment described above can be, for instance, a proprietary or just a normal trivial Zigbee message. For example, the network device can send a trigger message asking for a Zigbee neighbor table once in a while, wherein the neighbor table includes a list of all neighbor network devices that can communicate with the interacting neighbor network device and also a received RSSI for the communication with all neighbor network devices in the list. However, since the neighbor table may be only updated with the 15s Link Status messages, the RSSI data may have insufficient granularity for reliable radio frequency sensing on its own.

In an embodiment, the network device being, for instance, a Philips Hue light, can be controlled to send a proprietary trigger message, wherein the trigger message causes a neighbor network to extend its reply with additional metadata, for example, the neighbor network device can add to its reply the last 10 RSSI values it has seen within the neighboring network next to report the RSSI of the received trigger message. Such an embodiment can lead to a further penetration into an area occupied by the neighbor network devices or provide more sensing detail in the time domain.

In an embodiment, existing replies of a communication protocol, like Wi-Fi pinging, keep alive messages, etc., can be used for radio frequency sensing. Keep-alive messages such as Link Status messages in Zigbee, which can include a signal quality indication for all the network devices which a sending network device has heard from, are typically sent every 15 s. Using these messages for radio frequency sensing might lead in some applications to results that are not accurate enough. To improve the radio frequency sensing performance, for such cases, it is preferred that the network controlling unit is adapted to request that for a chosen subset of neighbor network devices the communication rate, for instance, the Link Status message providing rate, is increased to, for instance, one message per 2 s. Such an embodiment can also be combined with an embodiment in which both networks use the same communication channel. This improves the performance of radio frequency sensing based on just listening to the communication of the neighboring network, for instance, to the Link Status messages from the neighbor network devices.

Such a radio frequency sensing mode based solely on such keep-alive messages can be employed in areas with restrictions on the wireless messages, which however still have the need for basic radio frequency sensing. The increased frequency of providing communication messages can also be requested during dedicated time windows to avoid unnecessary clogging of the network in times in which no occupancy detection is necessary, and/or can be gated by a dedicated trigger message. For instance, security use cases typically run when the area/home is not occupied so that the amount of normal network device control messages is low, and any increased latency in the reaction to control commands, for instance, due to a higher amount of Link Status messages, can be accepted, since there is no one present who would suffer from the increased latency.

In an embodiment, the network controlling unit can be adapted to control the network device to utilize passive "eaves-dropping" by, for instance, measuring RSSI values of standard messages being sent around within the neighboring network. In such a case the radio frequency sensing network device might not be able to decode the messages sent by the neighbor network devices, but if such a message is received by the network device physically, an RSSI value for this message and possible the ID of the sending neighbor network device can be extracted by analyzing the header of the message and not the payload, i.e. the RSSI can be determined independently from the addressing.

Preferably, for this embodiment the network controlling unit is adapted to control the network to be on the same communication channel, for instance, the same Zigbee channel, as the neighboring network. Alternatively, in case of a Zigbee network, an "End Device" approach may be utilized in which a network device of the network is controlled to act as end device for its own network while eaves-dropping to messages on the neighboring network.

In an embodiment, a co-operative model between the network and the neighboring network can be utilized. This embodiment is particularly useful in an application in which the network is owned by a first owner and the potential neighboring network is owned by a second owner, i.e. a neighbor of the first owner. This embodiment will be described in the following with respect to this application, however, also other applications can be considered for this embodiment. The first owner of the network positioned in a first apartment and the neighbor can agree to use the above described invention of inter-network radio frequency sensing. In this case, the network controlling unit can control some of the first owner's network devices, i.e. "first devices" to change their status to an end device status with respect to the own "first" network, and to spend most of the time by listening to the communication on the communication channel of the neighboring network to run a radio frequency sensing based on the interaction with some of the neighbor network devices. The radio frequency sensing results can then be reported by the first devices being end devices to the own network, for instance, to an own network bridge. Preferably, in this embodiment, the network controlling unit can be adapted to control the network devices or to request a controlling of the neighbor network devices such that a shared encryption key is used for messages related to radio frequency sensing. In an example in which both networks comprise a bridge architecture, the bridges of both networks can be adapted to instruct the network devices associated with the respective bridge to use the shared encryption key for the messages related to radio frequency sensing based on a request of the network controlling unit. For multi-bridge applications the network controlling unit can be adapted to orchestrate between different bridges to provide a sharing of streaming encryption keys. However, it can be difficult for a single light to run radio frequency sensing simultaneously in both networks, e.g. both apartments, at the same time. Thus, if inter-network radio frequency sensing is required to run for both networks, it is preferred that different network devices in each network are assigned for the sensing in the network and the neighboring network, respectively. Preferably, in this arrangement both networks are controlled to use the same communication channel, for instance, Zigbee radio frequency channel. In this case, the network devices interacting with neighbor network devices can remain normal routers and can use standard InterPAN. However, also in this case it is still preferred that the encryption key for radio frequency sensing are shared between the own and the neighboring network.

If both networks are in "armed security" mode, the radio frequency sensing algorithm can run on a single set of network devices to cover both, the own and the neighbor's homes and/or gardens, with both homes benefitting from the same sensing cluster. For instance, if both, the apartment owner and his neighbor, have two network devices, like smart lights, in the garden, they can pool them into a detection group of four network devices based on the invention as described above. Preferably, in the basic versions the lights in both gardens then switch on if any movement is detected. In a preferred embodiment of this case details of radio frequency levels can be balanced to discern to which light and hence which of the two gardens the intruder is closest to. For example, when using Wi-Fi CSI sensing a sensing event is stronger if a human body is closer to the transmitting node rather than the receiving node.

In an application, one of the above described embodiments can be used for staircase monitoring in hotels or apartment complexes. In such an application, radio frequency sensing may be provided by lights from many different networks employing for instance different Philips Hue bridges, wherein the radio frequency sensing of the different networks can be based on the above described principles of the invention. In hotel complexes, most people use the elevator. However, some people use the staircase and the emergency exit door to leave the building instead. When exiting the hotel, the opening of the doorway to the exterior may enable, for instance, inwards tailgating of unwanted people, who do not have hotel keycard access credentials. Hence, there is a desire to monitor staircases for possible intruders. For this purpose, the above invention can be used, wherein upon detecting a person tailgating the network comprising a lighting system can be controlled by the network controlling unit to signal to the intruder that he has been detected, e.g. by providing light effects or a pre-recorded message, and asking the person to leave and re-enter by utilizing his room key. Optionally, a secondary detection mechanism may be applied to eliminate false triggers if a person opens the door first, but walks back into the house, for instance, since he/she has forgotten something. If the radio frequency sensing has detected in this case that a person is tailgating at the emergency exit, a picture of the possible intruder may be taken while any person having properly used his key card to gain entrance is not photographed due to privacy considerations.

Although in the above described embodiment, the network and the neighboring network are described to use a Zigbee or Wi-Fi communication protocol, in other embodiments also other communication protocols can be used, for instance, Thread, ESP-now or Bluetooth, while employing the same principles of the invention as described above.

Although in the above described embodiments, the networks exemplary described comprise more than one network device, in a special embodiment the networks can comprise only one network enabled network device such that in this case the network device can be considered as network and the extent of the detection area can be considered as zero or can depend on suitable reflectors in the environment of the network device that allow the network device to use its own signals for radio frequency sensing.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing information on a neighboring network, the controlling of at least one network device, etc., performed by one or several units or devices can be performed by any other number of units or devices. These procedures, particularly the control of the network device in accordance with the control method carried out by the radio frequency sensing control device can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a control device for controlling radio frequency sensing in a network, e.g. Zigbee or Wi-Fi network, comprising a detection area. The control device comprises a neighboring network information providing unit, wherein the neighboring network comprises a neighbor network device neighboring a network device of the network, and a network controlling unit for controlling a network device based on the provided neighboring network information such that the network device of the network is enabled to detect a signal usable for radio frequency sensing in a detection area extending outside of the detection area of the network and/or for radio frequency sensing in the detection area of the network, wherein the detected signal is transmitted by at least one neighbor network device. This allows to improve the radio frequency detection in peripheral areas of a network.

The invention claimed is:

1. A radio frequency sensing control device arranged for controlling radio frequency sensing in a network comprising at least one network device, wherein at least one of the network devices is adapted to perform radio frequency sensing in a detection area of the network based on the communication signals transmitted within the network, wherein the radio frequency sensing control device comprises:
a neighboring network information providing unit for providing information on a neighboring network, wherein the neighboring network comprises at least one neighbor network device neighboring at least one network device of the network, and
a network controlling unit arranged for controlling the at least one network device based on the provided neighboring network information, the at least one network device of the network being enabled by the network controlling unit to detect a signal usable for radio frequency sensing in a detection area extending outside of the detection area of the network and/or for radio frequency sensing in the detection area of the network, wherein the detected signal is transmitted by the at least one neighbor network device;
wherein the network controlling unit is adapted to control the at least one network device based on the provided information, the at least one network device being enabled by the network controlling unit to interact with at least one of the neighbor network devices, and wherein the network controlling unit is adapted to control the at least one network device to perform the radio frequency sensing based on the interaction with the at least one interacting neighbor network device; and
wherein the network controlling unit is adapted to control the at least one network device to interact with the at least one neighbor network device by sending a trigger message to the at least one interacting neighbor network device and to use the return signal of the at least one interacting neighbor network device for radio frequency sensing.

2. The radio frequency sensing control device according to claim 1, wherein the at least one network device in enabled by the network controlling unit to determine a signal quality characteristic of a communication signal of the at least one neighbor network device and uses the signal quality characteristic for radio frequency sensing.

3. The radio frequency sensing control device according to claim 1, wherein the return signal of the at least one interacting neighbor network device is indicative of its connections to other neighbor network devices of the neighboring network and/or of its connections to one or more network devices of the network based on the chosen trigger signal.

4. The radio frequency sensing control device according to claim 3, wherein the return signal is indicative of changes of the signal quality characteristics of the connections of the at least one interacting neighbor network device to other neighbor network devices of the neighboring network and/or its connections to one or more network devices of the network during a predetermined past time period.

5. The radio frequency sensing control device according to claim 4, wherein the network controlling unit is adapted to control the network device to perform a radio frequency sensing for the predetermined past time period based on the changes of the signal strengths of the connections between the at least one interacting neighbor network device and the connected neighbor network devices of a neighboring network during the predetermined past time period.

6. The radio frequency sensing control device according to claim 1, wherein the at least one network device is enabled by the network controlling unit to listen for network maintenance messages or other messages used for communicating between the network devices of the neighboring network, wherein the network controlling unit is then adapted to control the network device to perform a radio frequency sensing based on the received messages.

7. The radio frequency sensing control device according to claim 1, wherein the network controlling unit is adapted to control the at least one network device to interact with at least one neighbor network device by entering and becoming at least partially part of the neighboring network and to perform radio frequency sensing as part of the neighboring network, wherein the network controlling unit is further adapted to control the at least one network device to report the results of the radio frequency sensing performed as part of the neighboring network.

8. The radio frequency sensing control device according to claim 1, wherein the network controlling unit is adapted to control the at least one network device based on the provided information, the at least one network device being enabled by the network controlling unit to transmit a control trigger message that is able to control at least one of the neighbor devices to change a timing of communication signals used for communication within the neighboring network, and to control the at least one network device to use the communication signals of the neighboring network for radio frequency sensing.

9. The radio frequency sensing control device according to claim 1, wherein the neighboring network information providing unit is adapted to provide as information on the neighboring network a network channel on which a network device can communicate with the neighboring network, wherein the network controlling unit is adapted to control at least some of the network devices of the network to also communicate on the network channel provided by the neighboring network.

10. The radio frequency sensing control device according to claim 1, wherein the network is a Wi-Fi, Thread, Bluetooth, Cellular device2device communication, V2X protocol, ESP-now or a Zigbee network, and the neighboring network is a Wi-Fi, Thread, Bluetooth, Cellular device2device communication, V2X protocol, ESP-now or a Zigbee network.

11. A network comprising:
 at least two network devices, wherein at least one network device is adapted to perform radio frequency sensing in a detection area of the network, and
 a radio frequency sensing control device according to claim 1.

12. A radio frequency sensing control method for controlling radio frequency sensing in a network comprising at least one network device, wherein at least one of the network devices is adapted to perform radio frequency sensing in a detection area of the network based on the communication signals transmitted within the network, wherein the radio frequency sensing control method comprises:
 providing information on a neighboring network, wherein the neighboring network comprises at least one neighbor network device neighboring at least one network device of the network,
 controlling the at least one network device based on the provided neighboring network information, the network device of the network being enabled to detect a signal usable for radio frequency sensing in a detection area extending outside of the detection area of the network and/or for radio frequency sensing in the detection area of the network, wherein the detected signal is transmitted by at least one neighbor network device;
 controlling the at least one network device based on the provided information, the at least one network device being enabled to interact with at least one of the neighbor network devices, and wherein the network controlling unit is adapted to control the at least one network device to perform the radio frequency sensing based on the interaction with the at least one interacting neighbor network device; and
 controlling the at least one network device to interact with the at least one neighbor network device by sending a trigger message to the at least one interacting neighbor network device and to use the return signal of the at least one interacting neighbor network device for radio frequency sensing.

13. A non-transitory computer readable medium comprising computer executable instructions that, when executed, perform at least the method of claim 12.

* * * * *